Aug. 22, 1950  E. STRASSENBURG  2,519,409
VEGETABLE CUTTER
Filed Jan. 15, 1949  5 Sheets-Sheet 1
FIG. I.
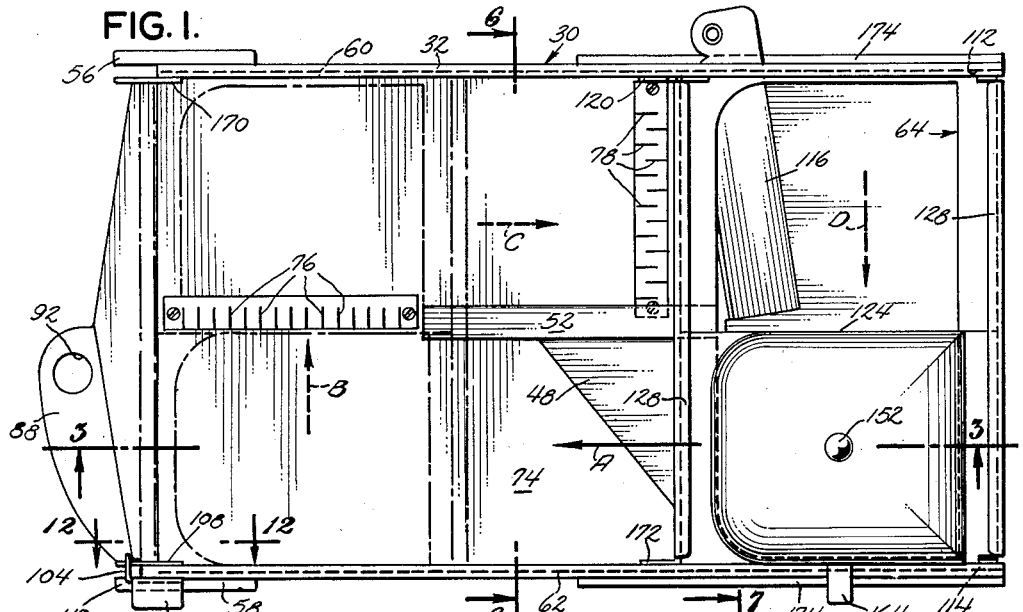
FIG. 2.
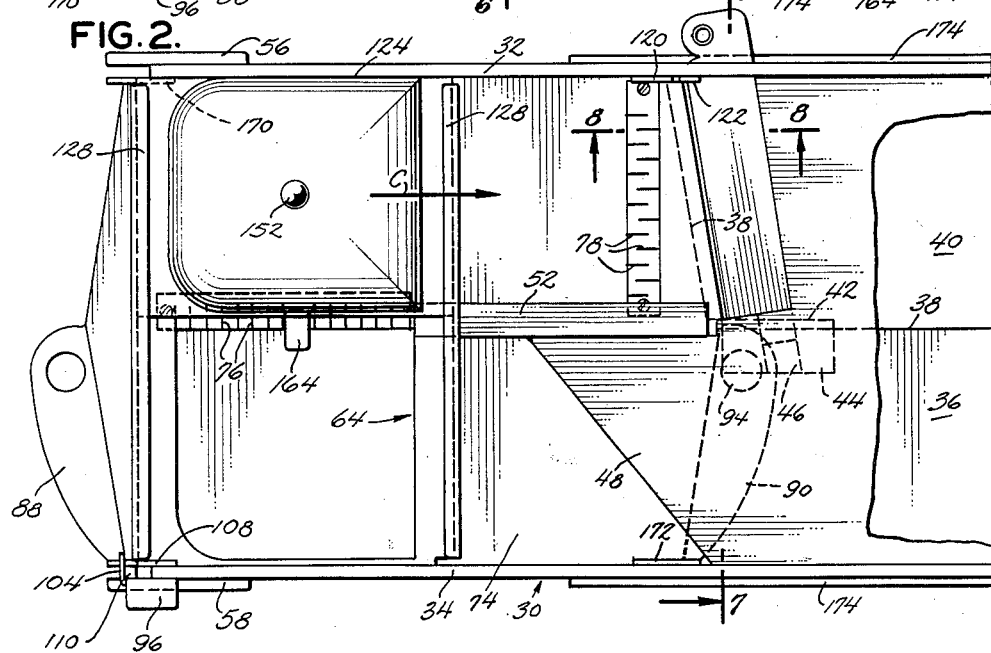
*INVENTOR.*
ERIC STRASSENBURG
BY
ATTORNEY

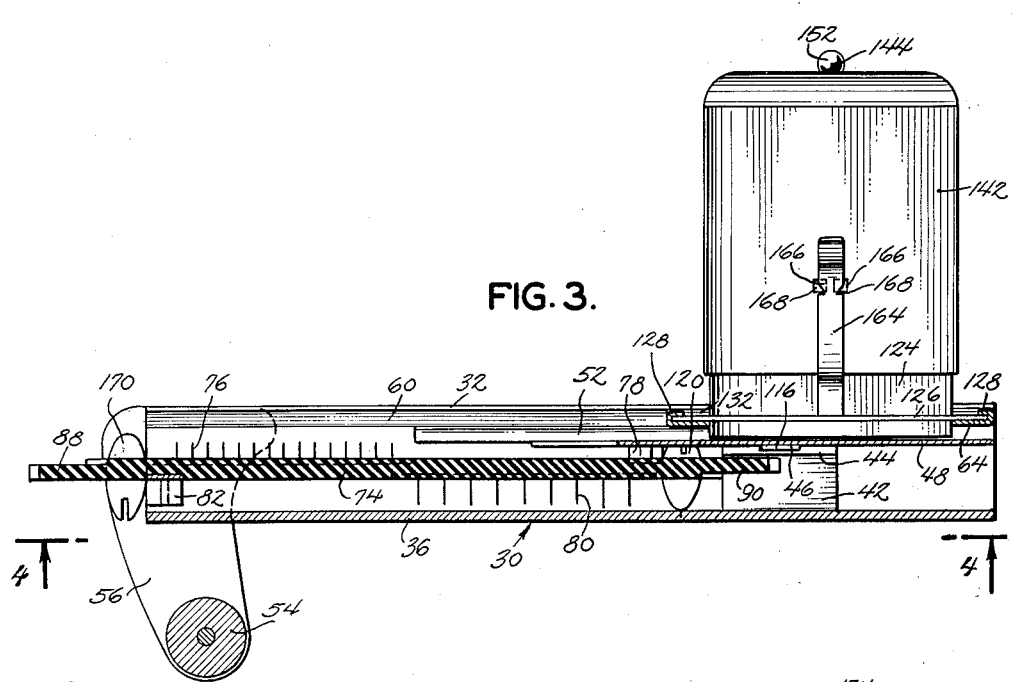
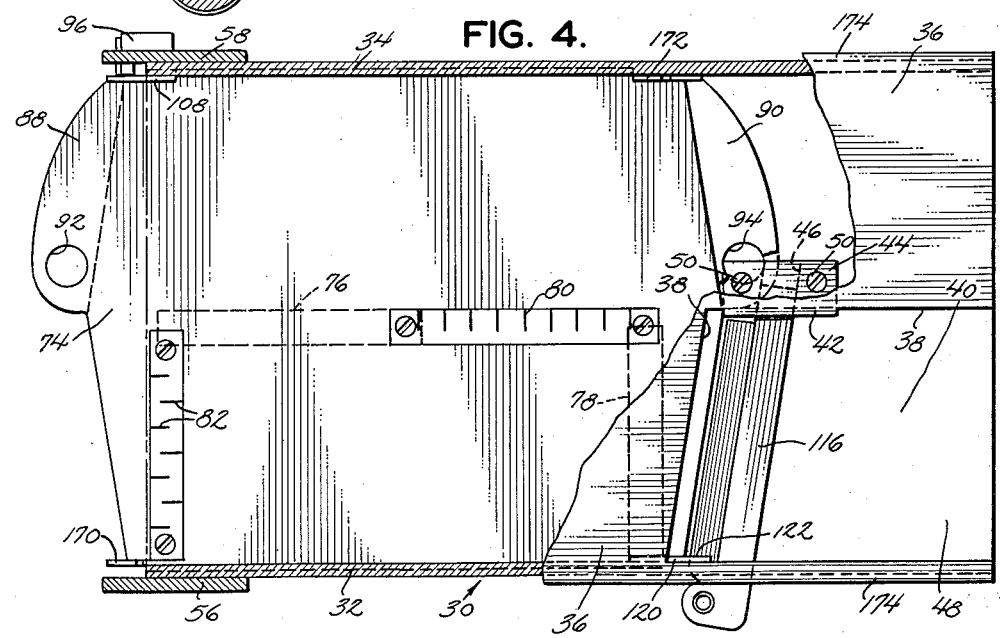

Aug. 22, 1950   E. STRASSENBURG   2,519,409
VEGETABLE CUTTER

Filed Jan. 15, 1949   5 Sheets-Sheet 3

*INVENTOR.*
ERIC STRASSENBURG
BY
*ATTORNEY*

Aug. 22, 1950  E. STRASSENBURG  2,519,409
VEGETABLE CUTTER
Filed Jan. 15, 1949  5 Sheets-Sheet 4
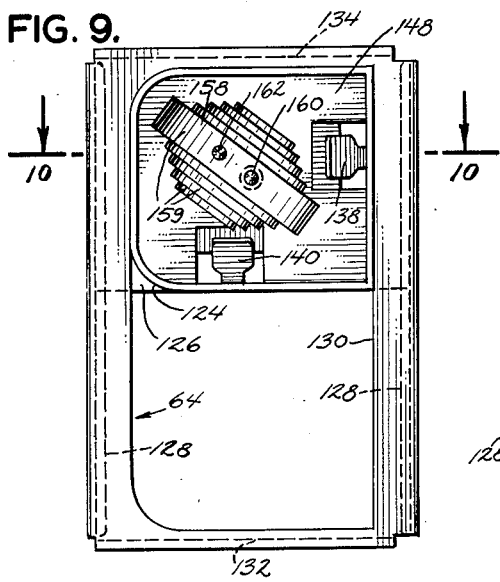
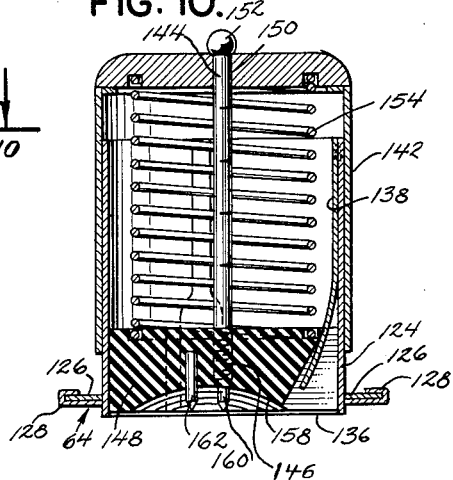
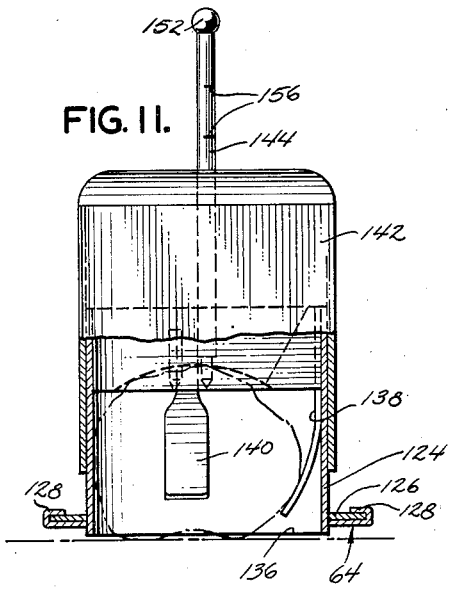
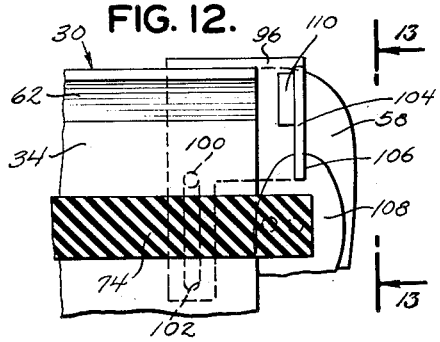
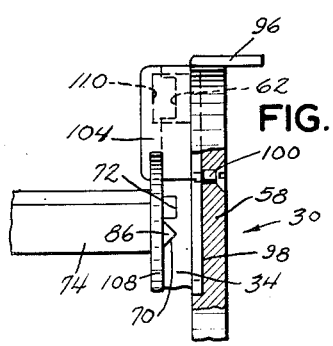
INVENTOR.
ERIC STRASSENBURG
BY
ATTORNEY

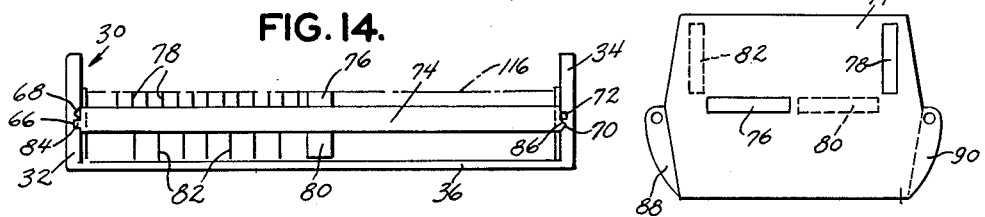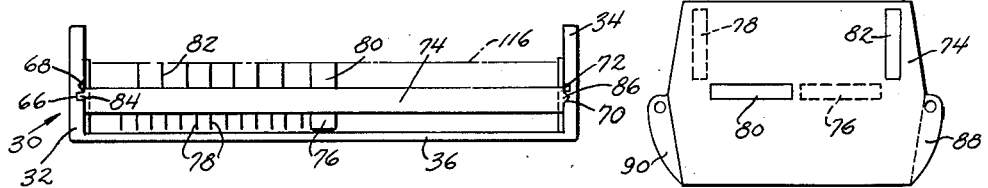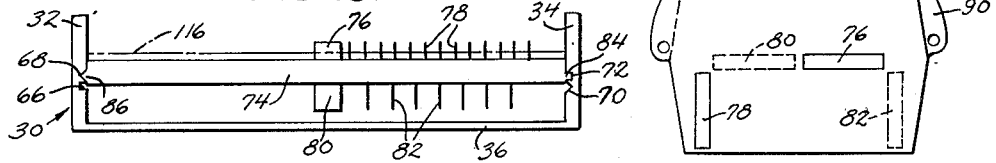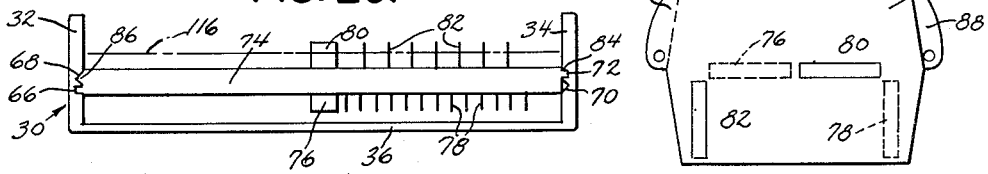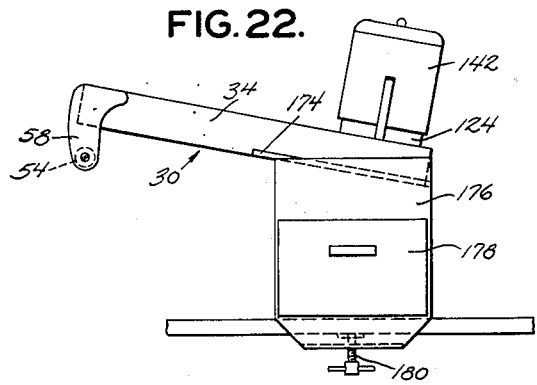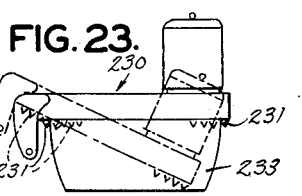

Patented Aug. 22, 1950

2,519,409

UNITED STATES PATENT OFFICE 2,519,409

VEGETABLE CUTTER

Eric Strassenburg, Bronx, N. Y.

Application January 15, 1949, Serial No. 71,109

6 Claims. (Cl. 146—78)

The present invention relates to kitchen utensils, and more particularly to a vegetable cutter.

An object of the present invention is to provide a vegetable cutter, by means of which vegetables may be cut either into slices, strips or cubes.

Another object of the present invention is to provide a vegetable cutter, which may be readily adjusted in such a manner that the pieces of a certain shape cut by the vegetable cutter may be obtained in different sizes.

A further object of the present invention is to provide a vegetable cutter by means of which onions may be readily cut into small cubes without bothering effects on the person handling the onions.

Another object of the present invention is to provide a vegetable cutter which is of simple construction and may be manufactured at low costs.

A further object of the present invention is to provide a vegetable cutter which may be readily used for cutting vegetables of different sizes and form.

Figure 5:
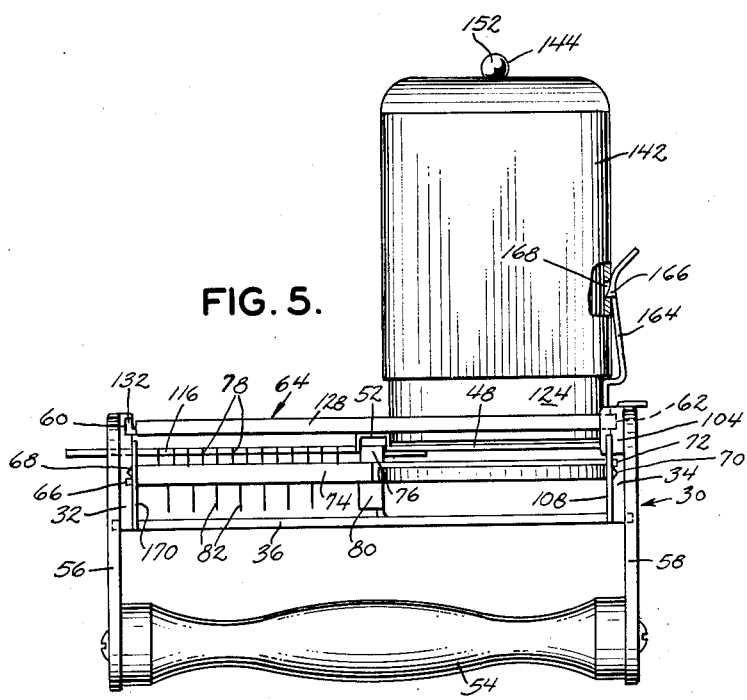
Figure 6:
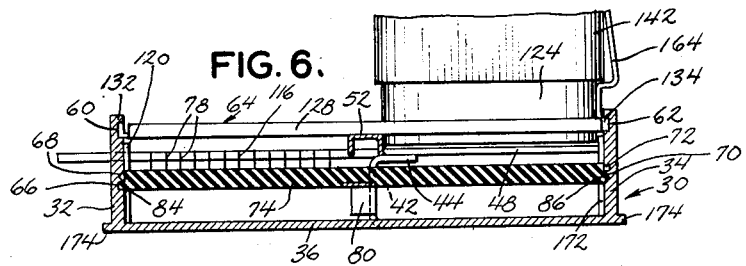
Figure 7:
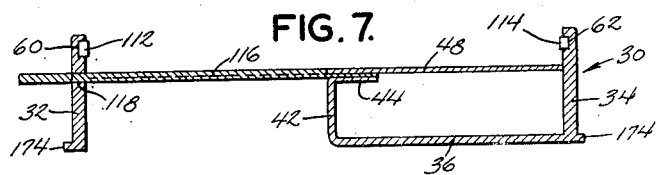
Figure 8:
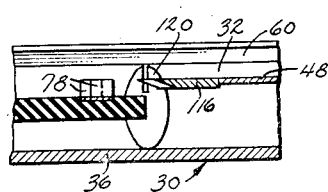

With the above and other objects of the invention in view, the invention consists in the novel construction, arrangement and combination of various elements and parts as described hereinafter and set forth in the claims hereof, embodiments of the same being described in the specification and being illustrated in the accompanying drawings forming part of this specification, wherein:

Fig. 1 is a top plan view of a vegetable cutter according to the invention,

Fig. 2 is a top plan view of the vegetable cutter similar to that shown in Fig. 1, wherein, however, the container receiving the vegetable is in a different position, Fig. 3 is a sectional view taken on line 3—3 of Fig. 1, Fig. 4 is a view taken on line 4—4 of Fig. 3, illustrating the bottom of the cutter, a portion of the bottom plate of its frame being broken away, Fig. 5 is a side elevational view of the vegetable cutter shown in Fig. 1, Fig. 6 is a sectional view taken on line 6—6 of Fig. 1, Fig. 7 is a sectional view taken on line 7—7 of Fig. 2, Fig. 8 is a sectional view taken on line 8—8 of Fig. 2, Fig. 9 is a bottom plan view of the slide and the container mounted thereon of the vegetable cutter according to the invention, Fig. 10 is a sectional view taken on line 10—10 of Fig. 8, Fig. 11 is a side elevational view, partly in section, of the container for receiving the vegetable, Fig. 12 is a sectional view taken on line 12—12 of Fig. 1, Fig. 13 is a side elevational view, partly in section, of the detail shown in Fig. 12 as seen in the direction of the arrows 13 of said Fig. 12, Fig. 14 is a somewhat fragmentary diagrammatical side elevational view of the vegetable cutter illustrating the board carrying the cutting blades in the same position relative to the shearing knife as shown in Figs. 1 and 5, Fig. 15 is a top plan view of the board carrying the cutting blades when it is in the position shown in Fig. 14, Fig. 16 is a fragmentary diagrammatical side elevational view similar to that shown in Fig. 14, wherein, however, the board carrying the cutting blades is in an inverted position, Fig. 17 is a top plan view of the board carrying the cutting blades when it is in the position shown in Fig. 16, Fig. 18 is a fragmentary diagrammatical side elevational view similar to that shown in Fig. 14, wherein, however, the board carrying the cutting blades is in a reversed position, Fig. 19 is a top plan view of the board carrying the cutting blades when it is in the position shown in Fig. 18, Fig. 20 is a fragmentary diagrammatical side elevational view similar to that shown in Fig. 16, wherein, however, the board carrying the cutting blades is in a reversed position, Fig. 21 is a top plan view of the board carrying the cutting blades when it is in the position shown in Fig. 20, Fig. 22 is a side elevational view illustrating the vegetable cutter in combination with a receptacle for receiving the cut pieces, and Fig. 23 is a side elevational view illustrating a different embodiment of a vegetable cutter according to the invention used in combination with a bowl.

Referring now to the drawings, 30 generally indicates a frame having longitudinal walls 32 and 34 rigidly connected with a bottom plate 36 in any suitable manner, for example by screws or by welding. Said bottom plate 36 is cut out along the lines 38 whereby an opening 40 is formed, as best shown in Figs. 2 and 4. Furthermore, at its righthand end portion as viewed in Figs. 3 and 4, a portion 42 of the bottom plate 36 is bent upwardly so as to form an upright adjacent said opening 40. Said upright 42 is provided with a flange 44 having a recess 46 for a purpose to be described hereinafter.

Moreover, as shown in Figs. 1–7 the frame 30 is provided with an intermediate plate 48 rigidly connected with the flange 44 of the upturned portion 42 of the bottom plate 36 by screws 50 (see Fig. 4). Said intermediate plate 48 is also rigidly connected with the longitudinal walls 32 and 34 of the frame by welding, for example. Substantially in the center of the frame said intermediate plate 48 is provided with a portion 52 shaped in the form of an inverted U. The length of said portion 52 is shorter than the length of the longitudinal walls 32. The longitudinal walls of said portion 52 are parallel to the longitudinal walls 32 and 34 of the frame 30. The portion 52 acts as a guiding element and a covering element in a manner to be described hereinafter.

At the left-hand end as viewed in Figs. 1–5, the frame 30 is provided with a handle 54 secured to its longitudinal walls 32 and 34 by arms 56 and 58.

Furthermore, the longitudinal wall 32 of the frame 30 is provided with a groove 60 extending in the longitudinal direction of the frame at the upper edge of said longitudinal wall; likewise, the longitudinal wall 34 of the frame 30 is provided with a groove 62 extending at its upper edge.

Said grooves 60 and 62 represent a track for a slide 64 which may be slidably engaged therewith. Upon engagement of said slide 64 with said grooves 60 and 62 the slide 64 is reciprocable in the direction of the longitudinal axis of the frame 30 for a purpose to be described hereinafter.

Moreover, the longitudinal wall 32 of the frame 30 is provided with a first longitudinal positioning channel 66 of substantially square cross-section and a second longitudinal positioning channel 68 of substantially V-shaped cross-section, the first channel 66 being arranged below the second channel 68. In a similar manner the longitudinal wall 34 of the frame is provided with a first longitudinal channel 70 of substantially V-shaped cross-section and a second longitudinal positioning channel 72 of substantially square-shaped cross-section. Said two positioning channels 70, 72 of the longitudinal wall 34 are arranged in a reversed position relative to the positioning channels 66 and 68 of the longitudinal wall 32, i. e., the positioning channel 72 having the square-shaped cross-section is arranged above the positioning channel 70 having the V-shaped cross-section. A board 74 carrying a series of transverse cutting blades 76 and a series of longitudinal cutting blades 78 at its upper surface and another series of transverse cutting blades 80 and another series of longitudinal cutting blades 82 at its lower surface, as viewed in Figs. 1–6, may be engaged with the longitudinal walls 32 and 34 of the frame by means of tongues 84 and 86 (see Fig. 6) arranged at opposite longitudinal sides of the board 74 for engagement with predetermined positioning channels of the longitudinal walls 32 and 34. As best shown in Fig. 6 the tongue 84 is of substantially square cross-section and the tongue 86 is of substantially V-shaped cross-section. When the board 74 is in the position shown in Figs. 1–6, the tongue 84 is engaged with the positioning channel 66 of the longitudinal wall 32 and the tongue 86 is engaged with the positioning channel 70 of the longitudinal wall 34. The tongues 84 and 86 may be engaged with positioning channels of the walls 32 and 34 of the frame 30 by sliding the board 74 in right-hand direction until it abuts against the upright 42. The board 74 is provided with a lug 88 and a lug 90 at each of its ends. Each lug 88 has an opening 92 and 94 respectively for facilitating the gripping of the board 74 by fingers of a hand when the board 74 is to be engaged with the frame or to be removed therefrom.

As best shown in Figs. 1, 2, 12 and 13, a locking element 96 is slidably engaged with a recess 98 of the arm 58 carrying the handle 54. The up- and downward movements of said locking element 96 are limited by the end of a screw 100 engaged with a slot 102 of said locking element 96. The locking element 96 carries a locking lug 104 capable of locking engagement with a recess 106 of a lug 108 of the board 74. Before the board 74 carrying the cutting blades is inserted into the frame 30 and before the slide 64 is engaged with the grooves 60 and 62 of the walls 32 and 34 of the frame, the locking element 96 is lifted from the position shown in Fig. 12 into a position, wherein the lower end of the slot 102 abuts against the screw 100. In said position the lug 104 of the locking element clears the path of the lug 108 of the board 74 and its lower end is above the level of the groove 62 of the wall 34. Therefore, when said locking element 96 is in said lifted position, the slide 64 may be engaged with the grooves 60 and 62 of the walls 32 and 34 and the board 74 may be engaged with the frame. After engagement of the slide 64 with said grooves 60 and 62 and of the board 74 with the frame 30 the locking element 96 may be returned into the position shown in Fig. 12 wherein its lug 104 is in engagement with the recess 106 of the lug 108 of the board 74 so as to hold same in its working position. Furthermore, as may be readily gathered from Fig. 12, the lug 104 of the locking element 96 carrying a rubber stop 110 now is in the path of the slide 64 engaged with the grooves 60 and 62, so that it acts as a stop for the slide 64 at one end of the frame.

As best shown in Figs. 1 and 7, at the other end of the frame the stroke of the slide 64 is limited by rubber stops 112 and 114 mounted on the walls 32 and 34 respectively.

According to the embodiment shown in the drawings, the series of cutting blades 76, 78, 80 and 82 are arranged on plates which are exchangeably secured to the board 74 by screws. The series of cutting blades 78 and 82 are arranged in a staggered arrangement. The individual cutting blades of the series of cutting blades 76 and 78 are of lesser height and are arranged nearer to each other than the individual cutting blades of the series of cutting blades 80 and 82.

As best shown in Figs. 1–8 the frame 30 is provided with a shearing knife 116. Said shearing knife 116 is loosely engaged with a slot 118 of the wall 32 (see Fig. 7) and the recess 46 of the flange 44 of the upwardly bent portion 42 of the bottom plate 36 (see Figs. 2–4 and 7). As best shown in Figs. 2 and 4, a lug 120 of the board 74 is engaged with a slot 122 of the knife 116 when the board 74 is in the working position shown in said figures. Thus, the shearing knife 116 is locked in its position by the board 74. When the board 74 is removed from the frame 30, the shearing knife 116 may be readily pulled out of the frame 30.

As shown in Figs. 1–3, 5, 6 and 9, a container 124 for receiving a vegetable to be cut into pieces is slidably mounted on the slide 64. As may be gathered from Figs. 3 and 9–11 the container 124 has a flange 126 slidably engaged with turned-over edges or channels 128 of the slide 64. The lower portion of the container 124 slidably engaged with an elongated transverse opening 130 of the slide 64 projects somewhat below the plane of said slide 64. The container 124 may be reciprocated on said slide 64 in a direction transverse to the direction of the longitudinal axis of the frame of the cutter. The stroke of the reciprocating movements of the container 124 is limited by flanges 132 and 134 (Fig. 9) of the slide 64 which, in turn, may be slidably engaged with the grooves 60 and 62 respectively of the longitudinal walls 32 and 34 of the frame 30.

The container 124 has an aperture 136 at its bottom (see Figs. 10 and 11). The upper ends of downwardly extending resilient strips 138 and 140 are secured by welding or otherwise to the upper edge of the container 124. The lower free ends of said resilient strips 138 and 140 are bent inwardly. Said resilient strips 138 and 140 have the tendency to urge a vegetable pressed in the container towards a corner thereof (upper left-hand corner as viewed in Fig. 9), so that the container may be readily used for vegetables of various sizes and shapes.

The container 124 may be closed by a cap 142 detachably and slidably engaged with said container. One end of a rod 144 is screwed into a threaded bore 146 of a pushing element 148 displaceably arranged in the cap 142. The free end of said rod 144 passing through a bore 150 in the top of the cap 142 is provided with a spherical enlargement 152 which may come to rest against the surface of the top of the cap 142 so as to act as a stop. A spring 154 interposed between the pushing element 148 and the top of the cap 142 tends to urge the pushing element away from the top of the cap until the spherical enlargement 152 of the rod 144 comes into abutting engagement with the top of the cap. In the embodiment shown in the drawing the rod 144 is provided with an indicating scale 156.

The surface of the pushing element 148 facing the aperture 136 of the container 124 is provided with an elliptical recess 158 capable of engagement with a vegetable. The elliptical recess arranged off the center of the pushing element 148 has a surface provided with a series of arcuate steps 159 arranged substantially parallel to the longitudinal axis of the elliptical recess 158. A pin 160 coaxial to the rod 144 and a pin 162 spaced from said first-mentioned pin 160 are secured to the pushing element 148 and project into the recess 158 thereof. The vegetable placed into the container 124 below the recess 158 is held in its position by the pins 160 and 162 penetrating into the vegetable. Furthermore, in addition to said pins 160 and 162 the arcuate steps 159 of the recess 158 act as gripping means for the vegetable. Said arcuate steps 159 prevent a sidewise escape of the vegetable which is urged by the resilient springs 138 and 140 towards a corner of the container 124 substantially in the direction of the longitudinal axis of the elliptical recess 158.

As best shown in Figs. 3 and 5 a strip 164 of resilient material attached at its lower end to the container 124 is provided with hook-like portions 166 capable of engagement with apertures 168 of the cap 142. Said strip 164 acts as a locking device in cooperation with said apertures 168 so as to hold automatically the cap 142 in its position against the action of the spring 154. For a release of the cap 142 the strip 164 is bent somewhat away from the cap 142 by pressing with a finger at its free end.

As will be readily understood, when the container 124 is loaded with a vegetable as shown in Fig. 11 and the cap 142 is secured to the container 124 by above-described locking device 164, the spring 154 (see Fig. 10) is compressed and the rod 144 projects to a certain extent from the top of the cap 142. The pushing means 148, 154 have the tendency to urge automatically the vegetable through the aperture 136 of the container 124 towards a surface of the cutter below the container 124.

As may be readily gathered from Figs. 3, 5 and 6, the walls of the portion 52 of the intermediate plate 48 are in contacting engagement with the lower portion of the container 124 projecting downwardly beyond the lower surface of the slide 64, so that said portion 52 acts as a guide for the container 124.

The operation of the vegetable cutter is as follows:

Assume the slide 64 carrying the container 124 is slidably engaged with the grooves 60 and 62 of the frame 30, the shearing knife 116 is placed into position and the board 74 carrying the cutting blades is placed into the position as shown in Figs. 1–6.

The board 74 locking the shearing knife 116 by means of its lug 122 is held in its position by the locking element 96 which, in turn, carries the stop 110 for limiting the stroke of the slide 64 at the left-hand end of the frame 30.

The slide 64 may be placed into the position shown in full lines in Fig. 1 at the right-hand end of the frame 30. Furthermore, the container 124 may be shifted on the slide 64 into the position shown in full lines in Fig. 1.

The container is loaded with a vegetable, whereupon the cap 142 is placed and locked on the container 124, so that the indicating rod 144 projects to a certain extent from the top of the cap 142 as shown in Fig. 11.

The spring 154 (Fig. 10) of the automatic pushing or feeding means urges the vegetable against the intermediate plate 48.

In order to start the operation of the vegetable cutter, the container 124 is gripped by hand for shifting the slide 64 in the direction of the arrow A (Fig. 1) until it reaches its other end position as shown in dash- and dot-lines in Fig. 1. During said shifting movement of the slide 64 the container 124 is guided by the guiding element 52, so that it cannot move relative to the slide 64. The container 124 performs a longitudinal movement relative to the frame 30 from the lower right-hand corner of the frame (as viewed in Fig. 1) into the lower left-hand corner of the frame (as viewed in Fig. 1 and shown in dash and dot lines in said figure). During said longitudinal movement of the container 124, the automatic pushing means associated therewith urge the vegetable towards and onto the board 74 carrying the cutting blades; during said movement, however, the vegetable is not yet cut.

Subsequently, the container is moved relative to the slide 64 from the lower left-hand corner of the frame (as viewed in Fig. 1) in the direction of the arrow B (Fig. 1) into the upper left-hand corner of the frame as shown in full lines in Fig. 2. During said transverse movement of the container 124 in the direction of the arrow B, the series of transverse cutting blades 76 makes transverse cuts into the lower portion of the vegetable.

Thereafter, the container 124 together with the slide 64 is moved in a longitudinal direction in the sense of the arrow C (see Fig. 2) from the upper left-hand corner of the frame (as viewed in Fig. 2) into the upper right-hand corner of the frame. During said longitudinal movement of the container 124 in the direction of the arrow C the series of longitudinal cutting blades 78 makes longitudinal cuts into the lower portion of the vegetable. Thereafter, the shearing knife 116 cuts off the lower portion of the vegetable previously cut by the cutting blades 76 and 78 so that cut pieces in the shape of cubes drop from the opening 40 of the bottom plate 36 of the cutter.

Then the container 124 is moved in the direction of the arrow D (see Fig. 1) from the upper right-hand corner of the frame into the lower right-hand corner of said frame as viewed in Fig. 1. No cutting of the vegetable takes place during said transverse movement of the container in the direction of the arrow D.

Now the container 124 is again in its starting position and above-described cutting process may be repeated as often as wanted; if desired, until the vegetable is practically used up.

During the cutting of the vegetable, the indicating scale 156 on the rod 144 gives an indication of the approximate amount of uncut vegetable still in the container.

As will be readily understood, during above described process the container 124 is guided along a rectangular path.

If it is desired to cut the vegetable into strips instead of into cubes, the slide 64 is placed into the same position as shown in full lines in Fig. 1, but the container 124 is placed on said slide 64 in such a position that it is in the upper right-hand corner of the frame (as viewed in Fig. 1). Thereupon, the container 124 together with the slide 64 are moved back and forth in a longitudinal direction, so that the container 124 passes merely over the series of longitudinal cutting blades 78 but not over the transverse cutting blades 76 which are outside its longitudinal path from the upper right-hand corner of the frame into the upper left-hand corner of the frame and vice versa. Thus, the vegetable may be cut into strips of substantially square cross-section.

If it is desired to cut the vegetable into slices instead of cubes or strips, the following steps are taken: The board 74 carrying the cutting blades is pulled out of the frame after having been released by the locking device 96. Then the board 74 is reversed from the position shown in Fig. 15 wherein the cutting blades 76 are to the left of the center of the board 74 and the cutting blades 78 are in the upper right-hand corner of the board 74 into the position shown in Fig. 19 wherein the cutting blades 76 are to the right of the center of the board 74 and the cutting blades 78 are in the lower left-hand corner of the board 74. During the reversing of the board 74 from the position shown in Fig. 15 into the position shown in Fig. 19 the tongue 84 of square cross-section has been brought from the left-hand side of the board 74 as viewed in Fig. 14 to the right hand side of said board as viewed in Fig. 18. Likewise, the position of the tongue 86 of V-shaped cross section has been reversed from the right-hand side of the board 74 as viewed in Fig. 14 to the left-hand side as viewed in Fig. 18. Now, when the board 74 is reengaged with the frame 30 of the cutter, the tongue 84 is engaged with the channel 72 of the wall 34 and the tongue 86 is engaged with the channel 68 of the wall 32. Owing to the arrangement of said channels and said tongues, the upper surface of the board 74 now is nearer to the cutting edge of the shearing knife 116 than it was while the board 74 was engaged with the frame in the manner shown in Fig. 14.

After the board 74 has been pushed into the frame by sliding the tongue 84 into the channel 72 and the tongue 86 into the channel 68 as indicated by Fig. 18 and the board has been locked in its working position by the locking device 96, the cutter may be operated for cutting the vegetable into slices. It will be noted that the series of cutting blades 76 now being to the right of the center of the board 74 are covered by the portion 52 of the intermediate plate 48 and that the series of cutting blades 78 now in the lower left-hand corner of the board 74 are outside of the path of the container 124. Therefore, if now the container is moved along a rectangular path as described above neither the cutting blades 76 nor the cutting blades 78 come into engagement with the lower portion of the vegetable. Merely the shearing knife 116 will cut slices from the vegetable which drop from the cutter through the opening 40. Of course, if desired, the container could also be merely reciprocated along a straight-line motion in the direction of the arrow C (Fig. 1) and opposite thereto, for cutting slices from the vegetable by means of the shearing knife 116.

As shown in the drawings, the board 74 has series of cutting blades 76 and 78 on one surface thereof and series of cutting blades 80 and 82 on the opposite surface thereof, the individual cutting blades of the series of cutting blades 80 and 82 being larger and at a greater distance from each other.

If it is desired to cut cubes or strips of larger size than the cubes or strips cut by the cutting blades 76 and/or 78, the board 74, after its removal from the frame 30 is inverted from the position shown in Fig. 15 into the position shown in Fig. 17, wherein now the series of cutting blades 80 takes the place formerly occupied by the series of cutting blades 76 and the series of cutting blades 82 takes the position formerly occupied by the series of cutting blades 78. As may be gathered from Fig. 16, the tongues 84 and 86 remain on the same side of the board 74 as they were when the board was in the position shown in Fig. 14. Upon re-engagement of the board 74 with the frame 30, the tongue 84 of square cross-section is again engaged with the channel 66 of the wall 32 and the tongue 86 of V-shaped cross-section is again engaged with the channel 70 of the wall 34. However, as said tongues 84 and 86 are in offset relationship with respect to the center plane of the board 74, the upper surface of the board 74 when being placed into the position shown in Fig. 16 is at a larger distance from the cutting edge of the shearing knife 116 than the upper surface of the board 74 when placed into the position shown in Fig. 14.

When the board 74 thus is arranged in the position shown in Fig. 16 with the cutting blades 80 and 82 at its upper surface, the container 124 may be moved along a rectangular path or in a reciprocating straight-line motion in the manner described above for cutting cubes or strips.

If it is desired to cut slices of larger thickness than the slices cut by an arrangement of the board 74 in the position shown in Fig. 18, the board 74 is inverted from the position shown in Fig. 19 into the position shown in Fig. 21. As shown in Fig. 20 now the tongue 84 of square-shaped cross section is in engagement with the channel 72 of the wall 34 and the tongue 86 of V-shaped cross-section is in engagement with the channel 68 of the wall 32. In said position the upper surface of the board 74 is at a larger distance from the cutting edge of the shearing knife 116 than the upper surface of the board 74 when in the position shown in Fig. 18.

Now slices may be cut from the vegetable by reciprocating the container 124 in and opposite to the direction of the arrow C.

As will be readily understood from above, a vegetable cutter equipped with a reversible and invertible board 74 as shown in the drawings permits the cutting of vegetables into pieces of six different shapes and/or sizes (cubes of two different sizes, strips of two different sizes, and slices of two different sizes). If desired, the user of the vegetable cutter may have one or more additional boards carrying cutting blades of different sizes and arrangement, which may be substituted for the board 74 shown in the drawings, whereby the variety of pieces obtainable by the cutter may be increased accordingly.

In order to assure a proper engagement of the tongues 84 and 86 of the board 74 with predetermined positioning channels 68—72, when the board 74 is pushed into the frame so as to occupy one of the four positions shown in Figs. 14, 16, 18 and 20, the board 74 is provided with the following selecting means: as mentioned above, the board 74 is provided at two of its corners with lugs 108 and 120. There are also lugs 170 and 172 attached to the board 74 at its two other corners. All of said lugs project to a certain extent from the plane of the surfaces of the board 74 carrying the blades 76 and 78 and the blades 80 and 82 respectively. The projecting ends of said lugs are of different heights. When the board 74 is brought into position for engagement of its tongues 84 and 86 with two of the positioning channels 66—72, the lugs, for example the lugs 120 and 172 at the leading edge of the board 74, come into engagement with the bottom plate 36 of the cutter whereby the board 74 is held at such a distance from said bottom plate 36 that the tongues 84 and 86 are in alignment with the channels, for example the channels 66 and 70 with which they shall be engaged.

Instead of the arrangement of lugs 108, 170, 172 and 122 at the ends of the board 74 for selecting the proper channels for engagement with the tongues on the board, the board could also be provided with flanges extending along its sides and being of different heights at the ends of the frame.

According to the embodiment shown in the drawings and as best shown in Figs. 1, 2, 4, 6, 7 and 22 tongues 174 are attached to the longitudinal walls 32 and 34 of the frame. Said tongues 174 may be engaged with grooves of a container 176 having a drawer 178 for receiving pieces cut by the vegetable cutter. The container 176 may be attached to a table or the like by means of a clamping device 180. However, the use of the vegetable cutter is not limited to its combination with such a container 176 from which it may be readily detached.

According to the embodiment of a vegetable cutter shown in Fig. 23, the frame 230 of said vegetable cutter is provided at its lower surface with a plurality of teeth-like engaging elements 231 at each side of the frame. When the vegetable cutter is used in combination with a bowl 233 receiving the pieces cut by the vegetable cutter, the frame 230 of the vegetable cutter may be placed onto the bowl 233 in such a manner that the rim of the bowl comes into engagement with teeth of both series of teeth-like engaging elements 231 as shown in full lines in Fig. 23. This feature contributes to a safe and proper holding of the vegetable cutter on the bowl 233, whereby the cutting process is facilitated.

If desired, instead of placing the frame 230 on top of the bowl 233, one end of the frame could also be placed inside the bowl as shown in dash and dot lines in Fig. 23. In such a case the teeth of the series of teeth-like engaging elements at the other end of the frame 230 may also be brought into engagement with the rim of the bowl 233 for assisting in the holding of the frame in its place.

I have described preferred embodiments of my invention but it is understood that many omissions and changes may be made without departing from the spirit and scope of the invention set forth in the appended claims.

What I claim is:

1. A vegetable cutter comprising in combination: a frame, a board carried by said frame, a slide reciprocably arranged on said frame for movements in the direction of the longitudinal axis of said frame, said slide having a transverse elongated opening, a container capable of receiving a vegetable, said container being reciprocable on said slide in a direction transversely to the longitudinal axis of said frame, said container having an aperture at its bottom registering with said opening of the slide, pushing means associated with said container for urging a vegetable through the aperture at its bottom and through the opening of the slide against a surface below its path, guiding means on said frame for guiding said container along longitudinal paths and transverse paths, a first series of cutting blades arranged below the path of said container on said surface of the board for making transverse cuts into the lower portion of the vegetable during a transverse movement of the container at a transverse side of said frame, a second series of cutting blades arranged below the path of said container on said surface of the board for making longitudinal cuts into the lower portion of the vegetable during a longitudinal movement of the container at a longitudinal side of said frame, and shearing means arranged below the path of said container for shearing off the lower portion of the vegetable.

2. In a vegetable cutter as claimed in claim 1, said shearing means being arranged below the path of the container at the same longitudinal side as said second series of cutting blades.

3. In a vegetable cutter as claimed in claim 1, a longitudinal track on said frame slidably receiving said reciprocable slide, an additional track on said slide transverse to said longitudinal track of the frame, said additional track of said slide slidably receiving said reciprocable container, and an elongated guiding member mounted on said frame substantially in the center thereof, said guiding member being shorter than the longitudinal tracks of said frame and being arranged for cooperation with said container so as to guide same in its longitudinal and transverse paths.

4. A vegetable cutter comprising in combination: a frame, a board carried by said frame, said board being reversible from a first position into a second position, a slide reciprocably arranged on said frame for movements in the direction of the longitudinal axis of said frame, said slide having a transverse elongated opening, a container capable of receiving a vegetable, said container being reciprocable on said slide in a direction transversely to the longitudinal axis of said frame, said container having an aperture at its bottom registering with said opening of the slide, pushing means associated with said container for urging a vegetable through the aperture at its bottom and through the opening of the slide against a surface below its path, guiding means on said frame for guiding said container along longitudinal paths and transverse paths, a first series of cutting blades and a second series of cutting blades arranged below the path of said container on said surface of the board, said first series of cutting blades being arranged in a position for making transverse cuts into the lower portion of the vegetable during a transverse movement of the container at a transverse side of said frame when said board is in its first position, said second series of cutting blades being arranged in a position for making longitudinal cuts into the lower portion of the vegetable during a longitudinal movement of the container at a longitudinal side of said frame when said board is in its first position, said first and second series being arranged in a position outside the path of said container when said board is reversed into its second position, and shearing means arranged below the path of said container for shearing off the lower portion of the vegetable.

5. In a vegetable cutter as claimed in claim 4, a longitudinal track on said frame slidably receiving said reciprocable slide, an additional track on said slide transverse to said longitudinal track of the frame, said additional track of said slide slidably receiving said reciprocable container, and an elongated guiding member mounted on said frame substantially in the center thereof, said guiding member being shorter than the longitudinal tracks of said frame and being arranged for cooperation with said container so as to guide same in its longitudinal and transverse paths, and said guiding member being hollow for receiving and covering said first series of cutting blades when said board is reversed into its second position.

6. In a vegetable cutter as claimed in claim 4, a first and a second series of cutting blades being arranged on each of two opposite surfaces of said board, and said board being invertibly arranged on said frame whereby one of said two surfaces of the board may be placed selectively below the path of the container.

ERIC STRASSENBURG.

REFERENCES CITED

The following references are of record in the file of this patent:

UNITED STATES PATENTS

| Number | Name | Date |
|---|---|---|
| 492,814 | Laughlin | Mar. 7, 1893 |
| 537,831 | Kraemer | Apr. 23, 1895 |
| 555,834 | Taylor | Mar. 3, 1896 |
| 940,830 | Spenko | Nov. 23, 1909 |
| 2,473,165 | McKinney | June 14, 1949 |

FOREIGN PATENTS

| Number | Country | Date |
|---|---|---|
| 187,265 | Germany | July 12, 1907 |
| 193,974 | Germany | Jan. 9, 1908 |
| 303,178 | Germany | Jan. 26, 1918 |
| 685,806 | Germany | Dec. 23, 1939 |
| 486,118 | Great Britain | May 26, 1938 |